United States Patent [19]

Wendt et al.

[11] 4,229,869
[45] Oct. 28, 1980

[54] METHOD OF REPAIRING ALUMINUM PLATE FIN COILS

[75] Inventors: Michael E. Wendt, Mt. Washington; Gerald J. Kushner, Louisville, both of Ky.

[73] Assignee: General Electric Company, Louisville, Ky.

[21] Appl. No.: 47,507

[22] Filed: Jun. 11, 1979

[51] Int. Cl.³ ............................................. B23P 15/26
[52] U.S. Cl. ............................... 29/157.4; 29/157.3 C; 29/402.11; 29/402.08; 113/118 C
[58] Field of Search .................... 29/157.3 B, 157.3 A, 29/157.3 C, 157.3 R, 157.4, 402.11, 402.09, 402.08; 113/1 C, 118 C, 118 V

[56] References Cited

U.S. PATENT DOCUMENTS

| | | | |
|---|---|---|---|
| 1,865,444 | 7/1932 | Recker et al. | 29/157.3 R |
| 2,394,831 | 2/1946 | Woods | 29/157.4 |
| 2,411,246 | 11/1946 | Clapper | 29/157.4 |
| 3,208,136 | 9/1965 | Joslin | 29/458 |
| 3,498,866 | 3/1970 | Kilbane | 156/285 |
| 3,828,412 | 8/1974 | Dreksler | 29/157 R |
| 3,857,151 | 12/1974 | Young et al. | 29/157.3 B |
| 3,877,518 | 4/1975 | Dreksler | 165/150 |
| 3,937,641 | 2/1976 | Kushner et al. | 156/87 |
| 3,962,767 | 6/1976 | Byerley et al. | 29/157.3 R |
| 4,043,018 | 8/1977 | Neff | 29/157.4 |
| 4,076,167 | 2/1978 | Wright | 29/157.3 R |

FOREIGN PATENT DOCUMENTS 767549 5/1934 France .................................... 113/118

*Primary Examiner*—Francis S. Husar
*Assistant Examiner*—V. K. Rising
*Attorney, Agent, or Firm*—Frank P. Giacalone; Radford M. Reams

[57] ABSTRACT

Damaged end portions of tubes are repaired from a multi-tube finned coil in which the tubes are expanded into intimate contact with the fins. The method consists of removing the damaged end portion of the tube adjacent the area in which the tube projects from the coil body. A replacement stub tube member having one end dimensioned to be similar to the removed end portion and the other end portion dimensioned to be inserted into the coil tube. After the end portion dimensioned to be inserted in the coil tube is arranged therein, a portion thereof is expanded so that its inner diameter is at least equal to that of the tube coil.

14 Claims, 11 Drawing Figures

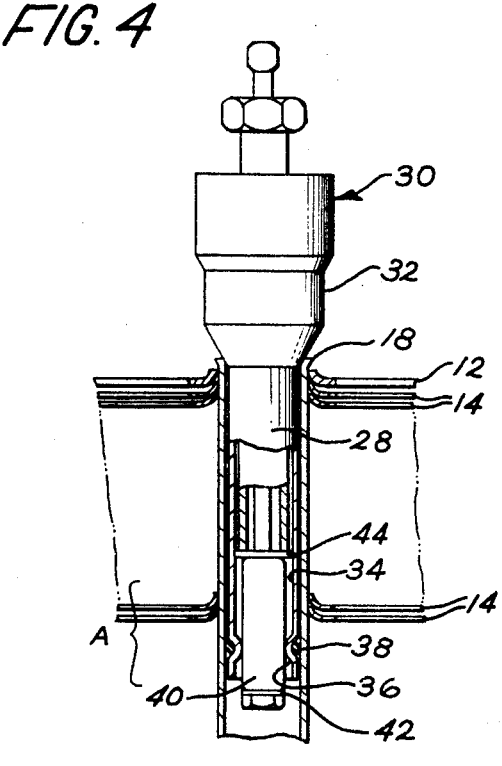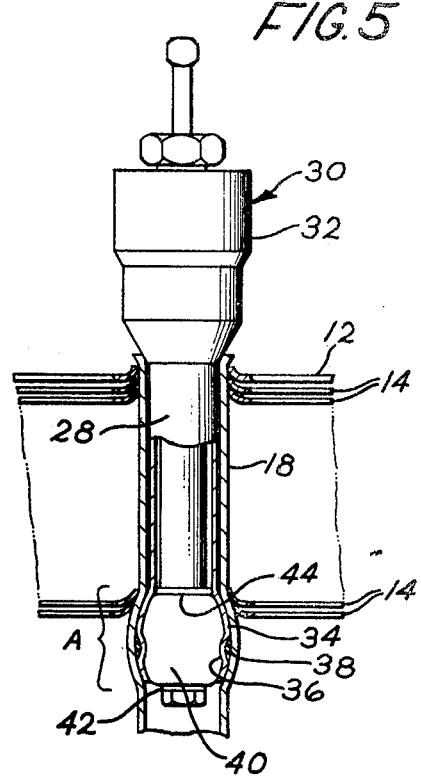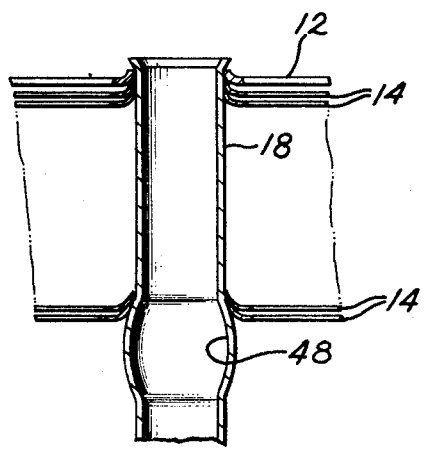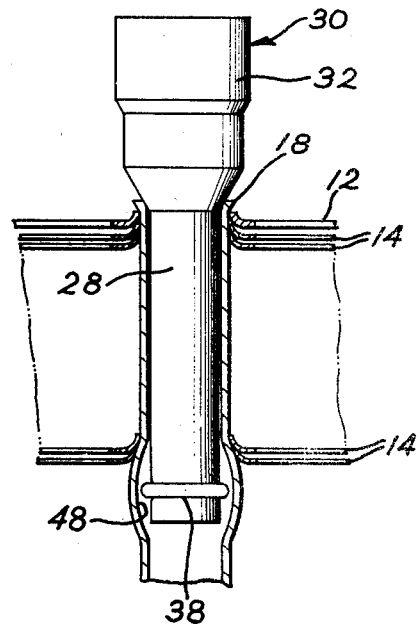

METHOD OF REPAIRING ALUMINUM PLATE FIN COILS

BACKGROUND OF THE INVENTION

1. Field of Invention

The invention relates to a fin and tube heat exchanger including end plates and a series of spaced parallel fins arranged therebetween that are provided with apertures which accommodate the tubes with the tube end portions extending through the end plates with connectors joined thereto, and more particularly to the method of replacing defective end portions of the tubes.

2. Description of the Prior Art

Many heat exchange coils are now constructed with a large number of aluminum "U" tubes extending transversely through holes in aluminum fins. After the assembly of the tubes to the fins, the tubes are then expanded outwardly to seat tightly against the fin material defining the holes in which the tubes are situated. The open ends of the tubes extending through the fins are expanded and dimensioned to receive connectors. Then, aluminum return bend connectors and other fittings such as tripods, crossovers, and various headers are placed on the open ends of the tubes and the heat exchanger is subjected to an operation in which these fittings are permanently joined to the tube ends by means of solder or adhesive.

Several differing types of soldering operations may be used, such as flame preheat/ultrasonic solder bath dip and flame preheat with suitable flux and solder alloy in which some of the joints may become sufficiently hot that one or more return bends or other fittings may be effectively destroyed or damaged along with the bell end of the tube in which the fitting is located. Furthermore, these same parts may be exposed to sufficiently intense ultrasonic energy that they may be effectively destroyed due to cavitation erosion. This problem can arise because different fittings present different heat transfer and ultrasonic energy problems so that while one setting may be quite proper for one type of joint, it may be incorrect for another particular joint and damage to the tube ends and fittings may result. Further, defects in the tube end portions, such as pin holes, splits, cracks, partial melt downs, etc. that are caused when the end portion and tubes are worked on before and/or after the main soldering operation can also cause leaks which would render the heat exchanger useless for employment in a sealed refrigeration system.

Irrespective of the cause, a tube which has its end damaged must either be repaired or the entire coil scrapped. Since the coils include substantial material in the form of tubes, fins, and fittings, as well as labor cost invested therein, scrapping of the coils is very costly.

In some prior art, approaches to repairing the coil and the tubes, including the defective portion, are removed. One way which has been employed for removing tubes is to slit the wall of the tube longitudinally by a device that is pushed through the tubes. Another way is to cut a helix in the tube wall the length of the tube and then pulling the tube out by collapsing the helix on itself.

In the type of heat exchanger with which the present invention is concerned, the tube is expanded outwardly throughout its total length to seat tightly in the apertures of each of the fins and plates through which the tube passes. This type heat exchanger requires that the expanded tube be relieved from its contact with all of the apertures along its entire length. This requires highly specialized tools and skill on the part of the repair person to insure that the apertures from which the tube was removed are left in such condition that the tube can be replaced and the coils salvaged. This procedure is further complicated in that typically tubes having a U-shaped configuration are employed which necessitate the removal of both legs of the U-shaped tube.

SUMMARY OF THE INVENTION

The present invention is an improvement over the application of Michael Wendt, designated 9D-CC-13577, an identifying number of the General Electric Company, the assignee of the present invention, and relates to a fin and tube heat exchanger, including end plates, a series of spaced parallel fins having apertures therein that are arranged between the end plates. The tubes are arranged in the apertures having their end portions extending through the end plates and are dimensioned to receive the end portion of a connecting member to form a joint therebetween. The present invention provides the method of removing and replacing selected ones of the tube end portions comprising the steps of cutting of the selected tube end portion adjacent its respective end plate. A stub tube member is provided having a first portion dimensioned to be inserted in the tube and an expanded second portion dimensioned to receive the end portion of a connecting member. An annular groove is formed in the first portion of the stub tube member with sealing means being arranged in the groove. At least a portion of the outer surface of the stub tube first portion is coated with an adhesive and inserted in the tube. An expansion tool having an expandable member whose relaxed diameter is slightly less than the stub tube is inserted into the stub tube to the depth of the groove. The expandable member is then flexed so that it bulges the stub tube outward into an interference fit so that said sealing means in said groove provides an annular seal between the tube and stub tube with the resultant inner diameter being at least equal to the tube.

BRIEF DESCRIPTION OF THE DRAWINGS

FIG. 4 is an elevational view of the end portions of the tubes partially joined;

FIG. 5 is a view showing the tube ends joined.

FIG. 6 is a partial elevational view of a part of a heat exchanger which shows another embodiment of the process;

FIG. 7 is an elevational view of the embodiment of FIG. 6 showing the parts partially joined.

DESCRIPTION OF THE PREFERRED EMBODIMENT

Figure 1:
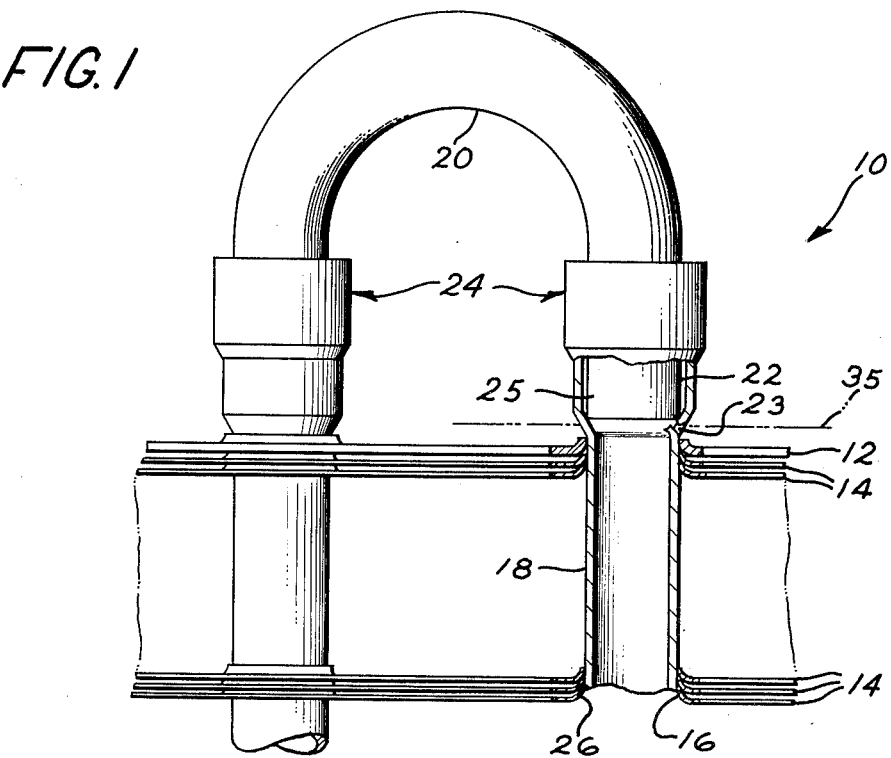
FIG. 1 is a partial elevational view of a part of a heat exchanger coil in which one end portion is depicted in a typically damaged condition.

Referring to FIG. 1, a fragmentary part of a heat exchange coil 10 is shown and includes an end plate 12, a series of parallel fins 14 provided with apertures 16 at laterally spaced position therein, a number of tubes 18 which have end portions 24 extending through the aligned apertures, and connectors shown in the present instance as end return bends 20 soldered to the open ends of tubes 18 to form a joint 22. After the tubes 18 are arranged in the apertures 16, they are expanded in diameter through their length to provide a tight contact with the fin collars 26 which define the apertures 16 through which the tubes 18 pass. The joint 22 between the return bends 20 and the tubes 18 is typically of a bell and socket arrangement in which, after the tubes have initially been inserted through the aperture 16 of fins 14 and expanded, the end portions 24 of the tubes 18 are belled out or enlarged in diameter sufficiently to receive the ends 25 of the return bends 20. It is during this expansion of end portion 24 to form the female portion of the joint 22 that damage can result, such as a weakening of the wall portion that may be destroyed during the subsequent soldering operation or, in some instances, a fracture or crack 23 develops adjacent end plate 12 as the point tube 18 expands beyond the dimensions of the opening therethrough.

After the return bends 20 and any other fitting which may be used are assembled to the open ends 24 of the tubes 18, the coil is subjected to a soldering operation in which the joints 22 between these various fittings and tubes are sealed. During the soldering, it sometimes happens that a part of or all of a joint 22 is effectively destroyed by localized elevated temperature and/or intensity of the ultrasonic energy. Effectively, the part of the tube end which is necessary to make a good sealing joint is damaged. As mentioned above, the end portion 24 adjacent the end plate 12 can also be damaged typically as shown at 23 in FIG. 1 at the time the tube end is formed to receive the end portion 25 of member 20 during the time the tube 18 is expanded or in subsequent soldering operations. The present invention provides a method of repairing the heat exchanger tubes irrespective of the cause by replacing the damaged end portion so that the heat exchanger is leak free and acceptable for use in a sealed refrigeration system. In the present method, the below-described tube repairs were effectively made in aluminum tube heat exchangers; however, the same repairs can be made in copper tube heat exchangers.

Figure 2:
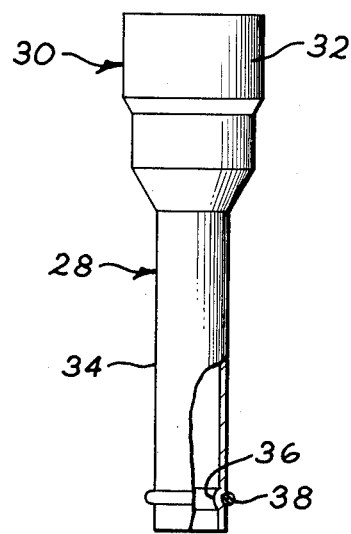
FIG. 2 is an elevational view of the stub tube used in carrying out the process of the invention.
Figure 3:
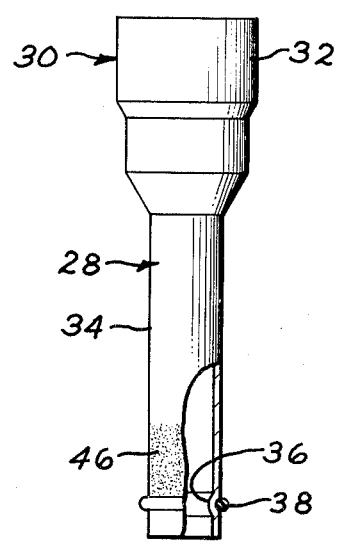
FIG. 3 is an elevational view showing another step in the present process.
Figure 8:
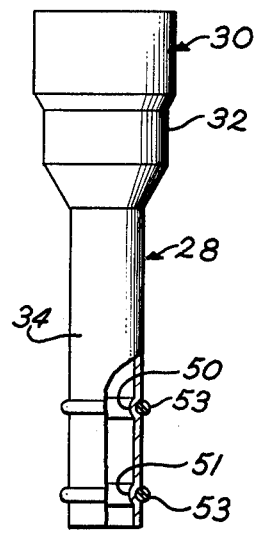
FIG. 8 is an elevational view of the stub tube used in carrying out the process of the invention.
Figure 9:
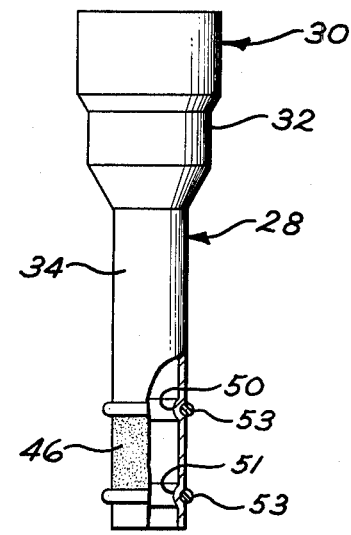
FIG. 9 is an elevational view showing another step in the present process.

With reference to FIGS. 2-7, there is shown the preferred embodiment in carrying out the method of the present invention of replacing an end tube portion 24 of tube 18 when defective. To this end, a stub tube member 28, as illustrated in FIGS. 2 and 3, is employed in a manner to be described below. The stub member 28 is formed on one end 30 to include a flared portion 32 which forms the female part of the joint 22. The portion 32 of member 28 is dimensioned as a replacement for the damaged end portion 24 and, accordingly, to receive the male portion 25 of the connector 20. The other end or portion 34 of stub tube 28 is dimensioned to be received in the tube 18 with a slight clearance between the inner wall of tube 18 and the outer wall of portion 34. While the repair of an end portion 24 is described, it should be noted that the other end a return of the "U"-shaped tube 18 may be repaired in the same manner.

The portion 34 of stub tube 28 is provided with an annular groove 36 which is in a plane substantially perpendicular to the axis of tube 28. Arranged in the groove 36 is a sealing means 38. The sealing means 38 in the present embodiment is in the form of an O-ring that is placed in the groove. The O-ring is made from a resilient material such as neoprene. It should be noted that other type sealing means may be employed, such as silicone, which can be applied to the groove and remain resilient.

The first step in carrying out the method is to remove the defective end portion. To this end, the defective end 24, as shown in FIG. 1, is cut along a line 35 adjacent the end plate 12 in a plane substantially perpendicular to the axis of the tube 18. It should be noted that in the event the defective end to be removed is connected, as shown in FIG. 1, to an end portion of an adjacent tube by a return bend member, it would be necessary to remove the connecting member prior to cutting off the defective end portion 24 of tube 18. The next step in the repair or replacement process, as shown in FIG. 4, is to insert the end portion 34 of member 28 into the tube member 18 so that the bell-shaped 32 of stub member 28 is arranged adjacent the end plate 12 in substantially the same position as that of the removed cut off end portion 24.

The next step in the repair or replacement process, as shown in FIG. 5, is to expand the portion 34 and the section of tube 18 in the area immediately above and below the groove and sealing means designated "A". In effect, the area "A" of portion 34 and tube 18 has a final diameter substantially equal to or larger than that of the tube 18. This is accomplished by positioning an expansible member 40 to the area "A", as shown in FIGS. 4 and 5, by any of several methods known to the art of heat exchange coil construction. After the member 40 is positioned in the area "A", it is caused to expand by drawing the bottom portion 42 axially toward the collar 44 so that a bulge, as shown in FIG. 5, is arrived at. It should be noted that exact method and mechanism for causing member 40 to expand radially outwardly does not form a part of this invention and any known system may be employed. The member 40 has an axial dimension and volume that is sufficient to cause the portion "A", as expanded, to form a bulge that forces the sealing means 38 into engagement with tube 18 to insure a seal at area "A" while, at the same time, securing the stub tube member against axial or longitudinal movement relative to the tube 18. It should be noted that the member 40 can be of the type wherein it is blown up hydraulically to a predetermined size. The intimate contact between the portion "A" of stub member 28 and the tube member 18, together with the seal in the area of the groove 36, caused by the expansion step in many instances is effective in providing a fluid tight fit therebetween. However, to insure a fluid tight seal up to the hydrostatic burst strength requirements which might approach 2100 psi, there is shown another embodiment in FIG. 3 of the invention wherein the portion of stub tube member 28 immediately above the annular groove 36 has applied thereto an adhesive designated at 46. The adhesive 46 may be one of the commercial available types, such as an epoxy. The adhesive is applied in the area above the groove 36 and provides an effective seal that extends the full axial length of Area "A".

Referring to FIGS. 3-7, there is shown still another embodiment of the invention wherein after the defective end portion 24 is removed, an expansion device as mentioned above is employed to form a bulge 48 in tube member 18, as shown in FIG. 6. The stub tube, including the sealing means 38 arranged in groove 36, is then positioned in tube 18, as shown in FIG. 7. With the parts so arranged, the expansion device 40 is now reapplied in the same manner as mentioned above to expand the stub tube member 28 into intimate contact with the bulge 48 of the previously expanded tube 18. In this embodiment, expanding tubes 18 and 28 separately requires less force and, accordingly, is easier to carry out, especially in the instance wherein the heat exchanger tubing may be of a harder metal, such as copper.

The final step in completing the repair process being to insert a return end into the new joint portion 22 formed in the stub tube 28 and to solder the new joint as shown in FIG. 1.

Referring now to FIGS. 8-11, there is shown still another embodiment of the invention wherein the portion 34 of stub tube 28 is provided with a pair of parallel annular grooves 50 and 51 which are in a plane substantially perpendicular to the axis of tube 28. Arranged in each of the grooves 50 and 51 is a sealing means 53. The sealing means 53 in the present embodiment is of the same type placed in the groove 36 of the embodiment of FIGS. 2-7.

Figure 10:
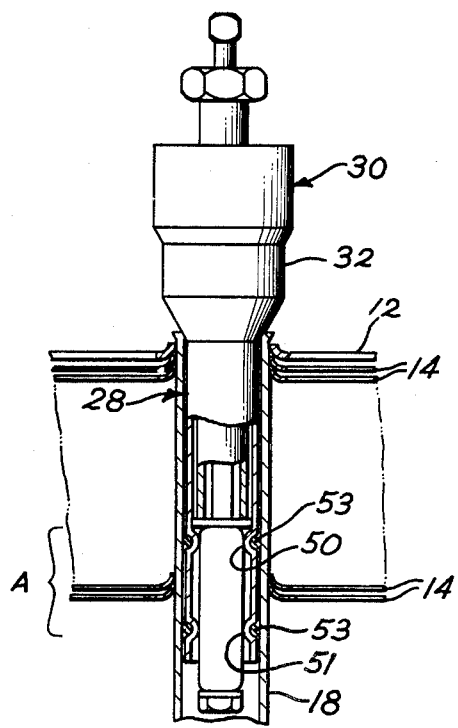
FIG. 10 is an elevational view of the end portions of the tubes partially joined.

The next step as in the embodiment of FIGS. 2-7 in the repair or replacement process, as shown in FIG. 10, is to insert the end portion 34 of member 28 into the tube member 18.

Figure 11:
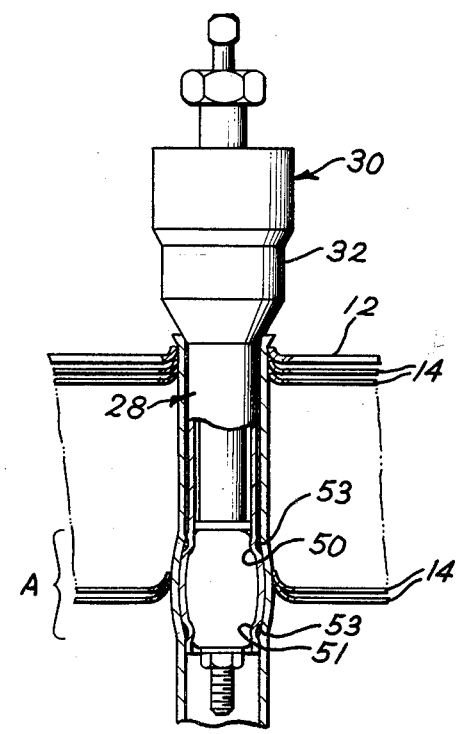
FIG. 11 is a view showing the tube ends joined.

The next step in the repair or replacement process, as shown in FIG. 11, is to expand the portion 34 and the section of tube 18 in the area encompassing both grooves, as designated "A". In effect, the area "A" of portion 34 and tube 18 has a final diameter equal to or larger than that of the tube 18. This is accomplished by positioning an expansible member 40 to the area "A" and expanding it in the manner described above.

The intimate contact between the portion "A" of stub member 28 and the tube member 18, together with the seal in the areas of grooves 36 and 37, caused by the expansion step in many instances is effective in providing a fluid tight fit therebetween. However, to insure a fluid tight seal up to the hydrostatic burst strength requirements which might approach 2100 psi, the same application of adhesive shown in FIG. 3 may be applied to the portion of stub tube member 28 between the annular grooves 36 and 37. The adhesive applied in the area between the grooves 36-37 provides an effective seal that extends the full axial length of Area "A". It should be noted that the embodiment shown in FIGS. 3 and 6 is applicable to the present embodiment.

It should be apparent to those skilled in the art that the embodiment described heretofore is considered to be presently preferred form of this invention. In accordance with the Patent Statutes, changes may be made in the disclosed apparatus and the manner in which it is used without actually departing from the true spirit and scope of this invention.

We claim:

1. The method of repairing defective tube end portion of a fin and tube heat exchanger, including end plates, a series of spaced parallel fins arranged between said end plates having apertures therein, tubes arranged in said apertures having their end portions extending through said end plates being dimensioned to receive the end portion of a connecting member to form a joint therebetween, comprising the steps of:

cutting off a defective tube end portion when present at a point adjacent its respective end plate,
providing a stub tube member having a first portion dimensioned to be inserted in said tube and an expanded second portion dimensioned to receive the end portion of a connecting member,
forming at least one annular groove in said first portion of said stub tube member,
arranging sealing means in said annular groove,
inserting said first portion of the stub tube member in said tube so that said second portion is adjacent said end plate,
providing an expansion member being dimensioned to fit into said stub tube member;
inserting said expansion member in said first portion of said stub tube and causing said expansion member to move said stub member and said tube outwardly to form a bulge in the area of said groove so that said sealing means in said groove provides an annular seal with the bulge having an inner diameter sufficient to prevent axial movement of said stub tube relative to said tube.

2. The method as recited in claim 1 wherein at least a portion of the outer surface of said stub tube above said groove is coated with an adhesive.

3. The method as recited in claim 2 wherein said stub tube and tube are made of aluminum.

4. The method as recited in claim 3 wherein said sealing means in said groove are O-rings made of resilient material.

5. The method recited in claim 1 wherein two parallel axially spaced grooves are formed in said first portion of said stub tube member.

6. The method recited in claim 5 wherein said expansion member has an axial dimension at least equal to the axial spacing of said grooves so that said bulge extends between said grooves and sealing means to provide two spaced-apart annular seals.

7. The method recited in claim 6 wherein an adhesive is arranged on at least a portion of said stub tube immediate said annular grooves.

8. The method of repairing defective tube end portion of a fin and tube heat exchanger, including end plates, a series of spaced parallel fins arranged between said end plates having apertures therein, tubes arranged in said apertures having their end portions extending through said end plates being dimensioned to receive the end portion of a connecting member to form a joint therebetween, comprising the steps of:

cutting off a defective tube end portion when present at a point adjacent its respective end plate,
providing a stub tube member having a first portion dimensioned to receive the end portion of a connecting member,
forming at least one annular groove in said first portion of said stub tube member,
arranging sealing means in said annular groove,
providing an expansion member being dimensioned to fit into said stub tube member;
inserting said expansion member in said tube and causing said expansion member to deform said tube sufficiently to form a bulge;
inserting said first portion of the stub tube member in said tube so that said second position is adjacent said end plate;
reinserting said expansion member in said first portion of said stub tube and causing said expansion member to move said stub member into intimate contact with said bulge in the area of said groove so that said sealing means in said groove provides an annular seal, with the resultant bulge having a diameter sufficient to prevent axial movement of said stub tube relative to said tube.

9. The method as recited in claim 8 wherein at least a portion of the outer surface of said stub tube intermediate said grooves is coated with an adhesive.

10. The method as recited in claim 9 wherein said stub tube and tube are made of aluminum.

11. The method as recited in claim 10 wherein said sealing means in said grooves are O-rings made of resilient material.

12. The method recited in claim 8 wherein two parallel axially-spaced grooves are formed in said first portion of said stub tube member.

13. The method recited in claim 12 wherein said expansion member has an axial dimension at least equal to the axial spacing of said grooves and sealing means to provide two spaced-apart annular seals.

14. The method recited in claim 13 wherein an adhesive is arranged on at least a portion of said stub tube intermediate said annular grooves.

* * * * *